Jan. 19, 1965  L. E. FOLEY, JR., ETAL  3,166,104
COIL WINDING MACHINE
Filed Oct. 1, 1958  5 Sheets-Sheet 4
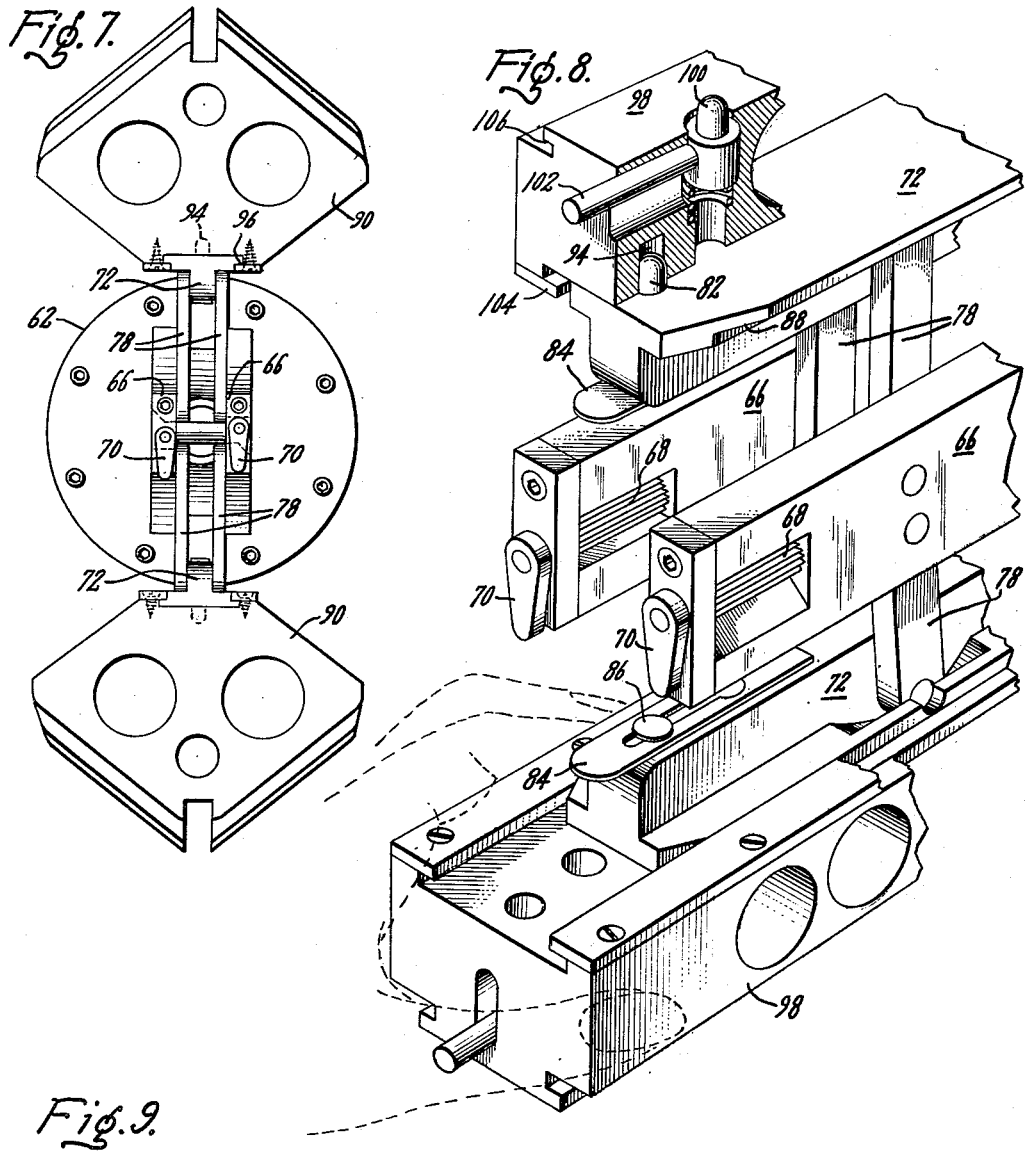
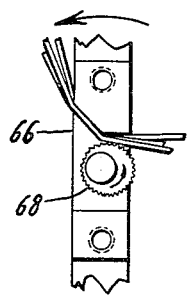
Inventors:
Leroy E. Foley, Jr.
John F. Paterson
by James R. Campbell
Their Attorney Jan. 19, 1965   L. E. FOLEY, JR., ETAL   3,166,104
COIL WINDING MACHINE
Filed Oct. 1, 1958   5 Sheets-Sheet 5
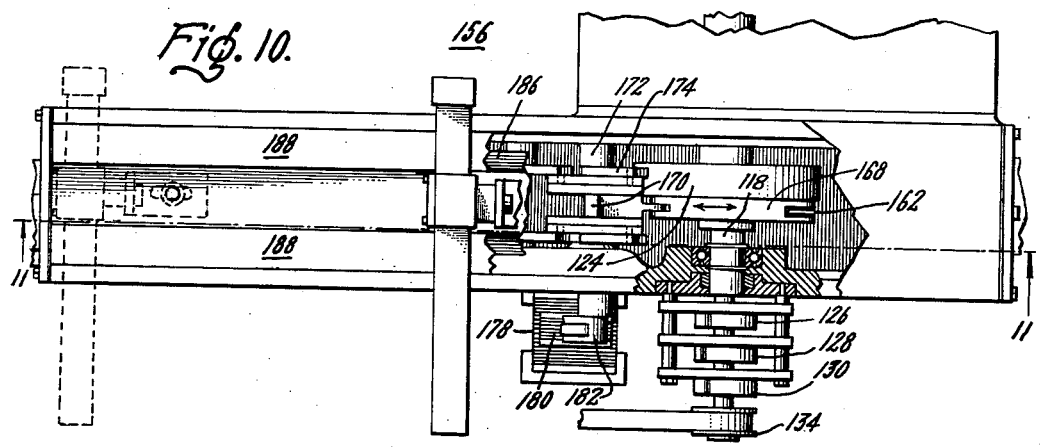
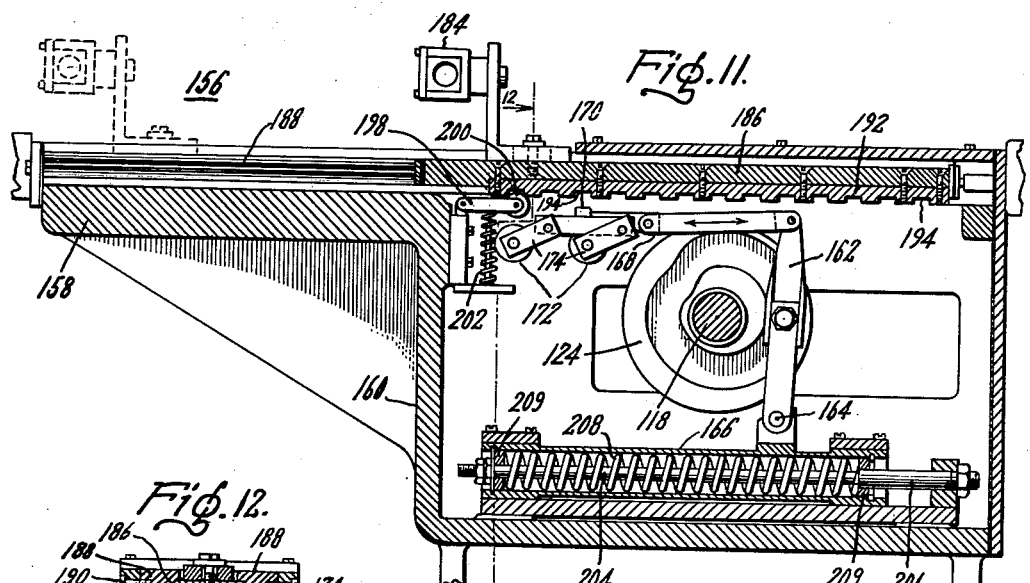
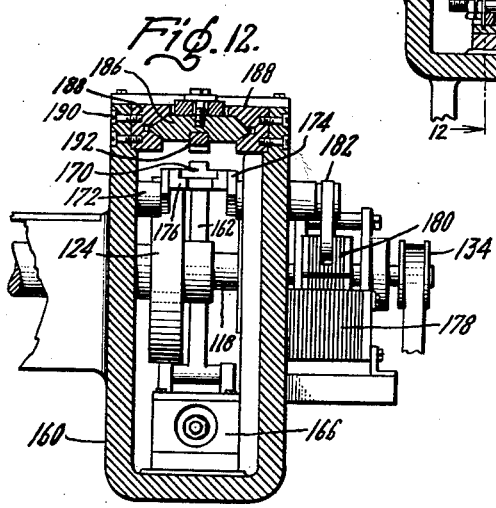
Inventors:
Leroy E. Foley, Jr.
John F. Paterson
by James L. Campbell
Their Attorney

United States Patent Office 3,166,104
Patented Jan. 19, 1965

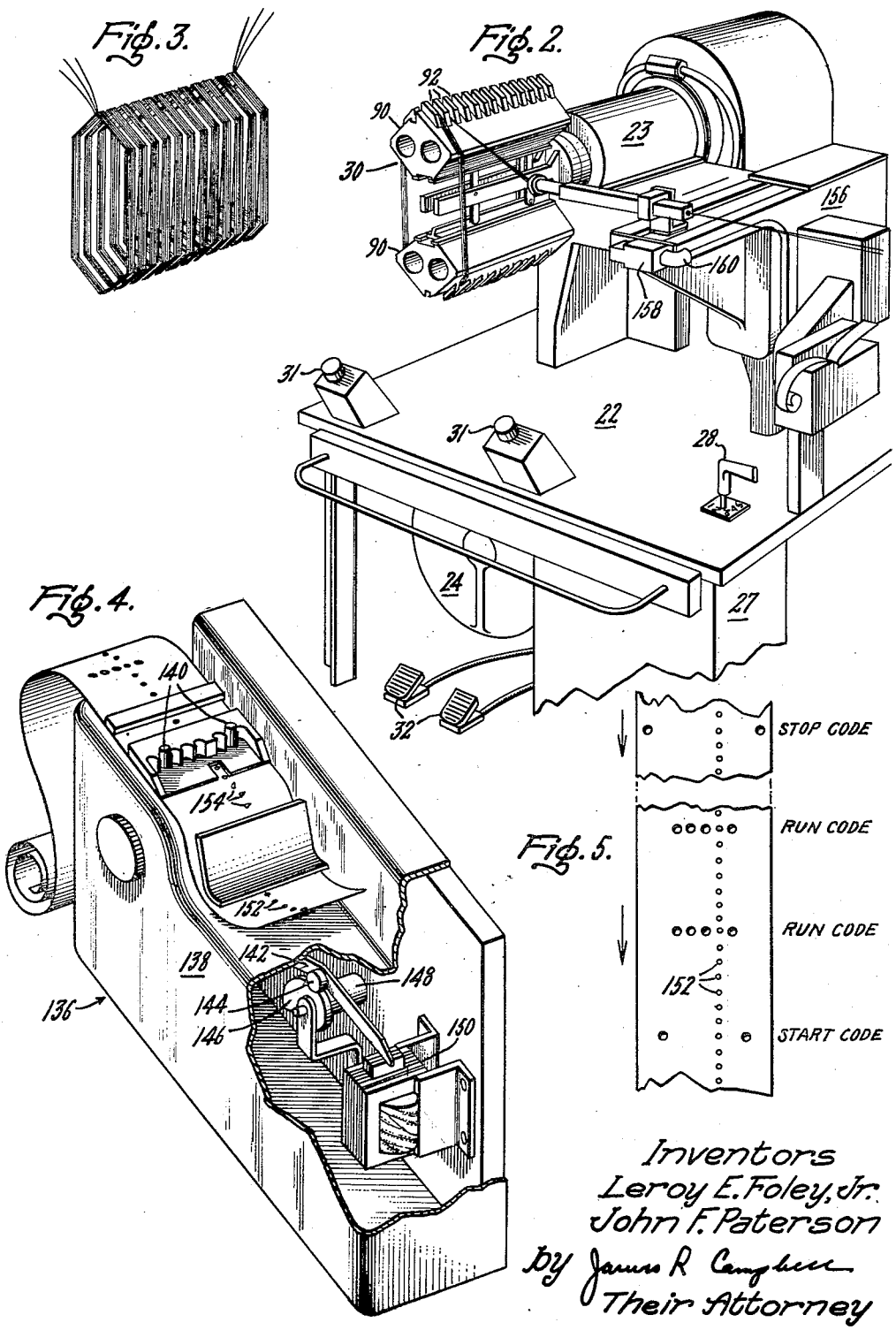

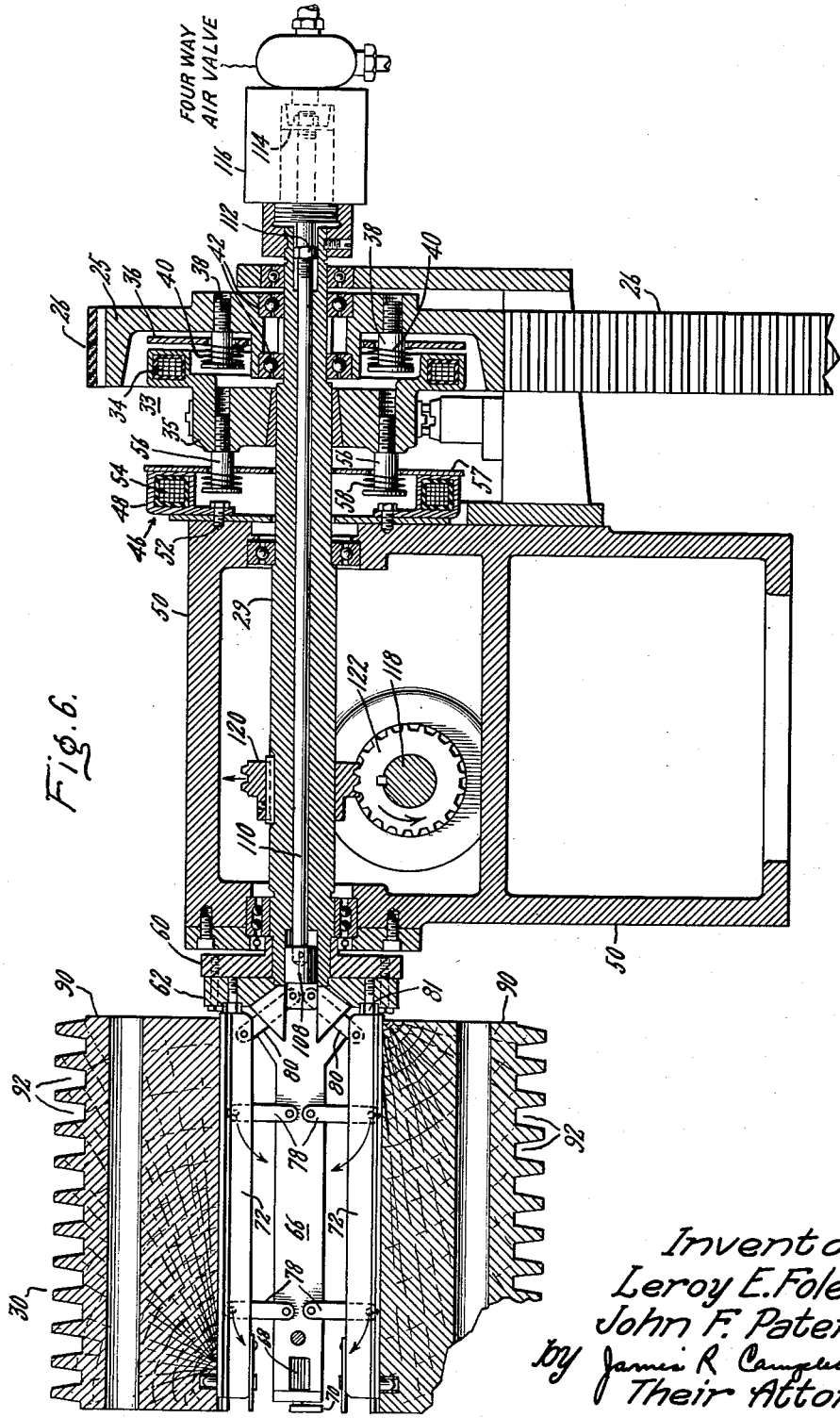

3,166,104
COIL WINDING MACHINE
Leroy E. Foley, Jr., Schenectady, N.Y., and John F. Paterson, Balboa, Canal Zone, assignors to General Electric Company, a corporation of New York
Filed Oct. 1, 1958, Ser. No. 764,616
9 Claims. (Cl. 140—92.2)

The invention described herein relates to coil winding machines and more particularly to a machine designed for forming and accurately winding random coils for dynamoelectric machines under completely automatic conditions of operation.

Random coil winding machines of the prior art inherently contain many disadvantages and deficiencies when considered in light of constantly increasing demands upon manufacturers for high quality coils at less cost. The conventional random coil winding machine is commonly referred to as a spool type winder and consists of a motor positioned to drive a mandrel through adjustable belts and gears capable of providing mandrel speeds compatible with the size of coil being wound. The mandrel is equipped with slots into which the turns of wire are wound successively to form separate, but connected, coils comprising the winding. As the wire is being wound, an operator observes a mechanical counter or manually counts the number of turns wound in each slot during mandrel operation. When the desired number of turns is wound in a particular slot, the wire is indexed to the next slot by manually moving the wire feeding mechanism along the length of the machine.

In view of the high level of operator attention needed and the number of manual steps required to be performed in carrying out the coil winding process, a considerable number of errors creep into the coil winding methods. The windings thus produced are not uniform in size, shape or quality and the output is very low because of the high degree of manual dexterity required for efficiently operating and controlling the machine. Moreover, as the machine operates, not only is the likelihood of errors great, but since the operator is required to work in an area involving nonshielded rotating parts, the operation accordingly is hazardous.

An incidental but important adverse effect resulting from this construction is that inadequate tension control means causes stretching of the wire between the wire reel and mandrel head. This action in turn causes damage to the wire insulation which directly affects operation of a motor or generator after the coils are fixed in the stator or rotor cores. Also, the coil configuration is restricted by the mandrel geometry and removal of the coils therefrom not only involves a time-consuming task but also is unnecessarily difficult.

It, therefore, is an object of our invention to eliminate the disadvantages and deficiencies inherent in prior art coil winding machines by providing a rapid, accurate and efficient machine capable of winding coils in a minimum of time under safe and economical conditions of operation.

Another object of our invention is to provide a coil winding machine completely automatic in operation which utilizes selected electric circuits for controlling rotation and stopping of the mandrel at any desired point at varying speeds and for accurately locating the desired number of turns in each slot and the correct number of coils in each winding.

Still another object of our invention is to provide an improved wire advance mechanism utilized in accurately feeding wire into successive mandrel slots in controlled time sequence.

Another object of our invention is to provide an improved machine design incorporating mandrel collapsing features for facilitating removal of wound coils from the machine.

Still another object of our invention is to provide an improved coil winding machine designed to minimize the time required for adjustments when coil specifications are changed.

In carrying out our invention, we provide for complete automatic operation of the coil winding machine by connecting a variable speed motor to the machine drive shaft through a magnetic clutch and brake. A driven collapsible mandrel provided with slotted form blocks for receiving the wire, is mounted on an end of the shaft. During shaft rotation, the correct number of turns of wire is guided automatically into each slot by a wire advance mechanism which is moved sequentially to the next slots for forming the individual coils comprising a winding of the type used in dynamoelectric machines. When all the coils are wound, the machine automatically stops. A tape reading head is driven in synchronism with the collapsible mandrel, and by means of a punched and coded tape and collateral circuitry associated with the head and with the mechanical operating components of the machine, control of the number of turns per slot is provided in addition to means for actuating the wire advance mechanism at the proper time to permit guiding of the wire into the next adjacent slot. Automatic control of the machine is effective under all conditions of operation and includes emergency stop circuitry, clutch-brake power supplies and control, winding mandrel collapsing control means and safety interlocks for each of these to protect the operator, materials and equipment and to provide a high quality product. Since a variable speed motor is utilized for permitting winding the coils at different speeds, the circuitry also includes variable braking adjustments to compensate for differences in stopping positions of the mandrel when operated at different speeds and for facilitating stopping of the mandrel in the same position regardless of the speed chosen.

The subject matter which we regard as our invention is particularly pointed out and distinctly claimed in the concluding portion of this specification. Our invention, however, both as to organization and method of operation, together with further objects and advantages thereof, may best be understood by reference to the following description taken in connection with the accompanying drawings in which:

FIGURE 2 illustrates a physical embodiment of the coil winding machine showing the arrangement of parts just prior to commencing a coil winding cycle;

FIGURE 3 is a perspective view of a winding formed by the machine of FIGURES 1 and 2;

FIGURE 4 is a perspective view of a tape reader head with parts broken away to illustrate the arrangement of moving parts within the housing;

FIGURE 5 shows a portion of the tape used with the tape reader head of FIGURE 4 including punched holes representing coded information for controlling the machine;

FIGURE 6 is a view in elevation, partly in section, of the mandrel, brake and clutch components associated with the machine;

FIGURE 7 is an end view of the apparatus shown in FIGURE 6;

FIGURE 8 is an enlarged view of the outer end of the mandrel illustrating the means utilized in attaching form blocks to arbor jaws;

FIGURE 9 illustrates an eccentric clamp arrangement for holding the wire in position on the mandrel;

FIGURE 10 is a plan view, with parts broken away, showing the wire advance mechanism;

FIGURE 11 is a view taken on lines 11—11 of FIGURE 10; and

FIGURE 12 is a view taken on lines 12—12 of FIGURE 11.

Figure 1:
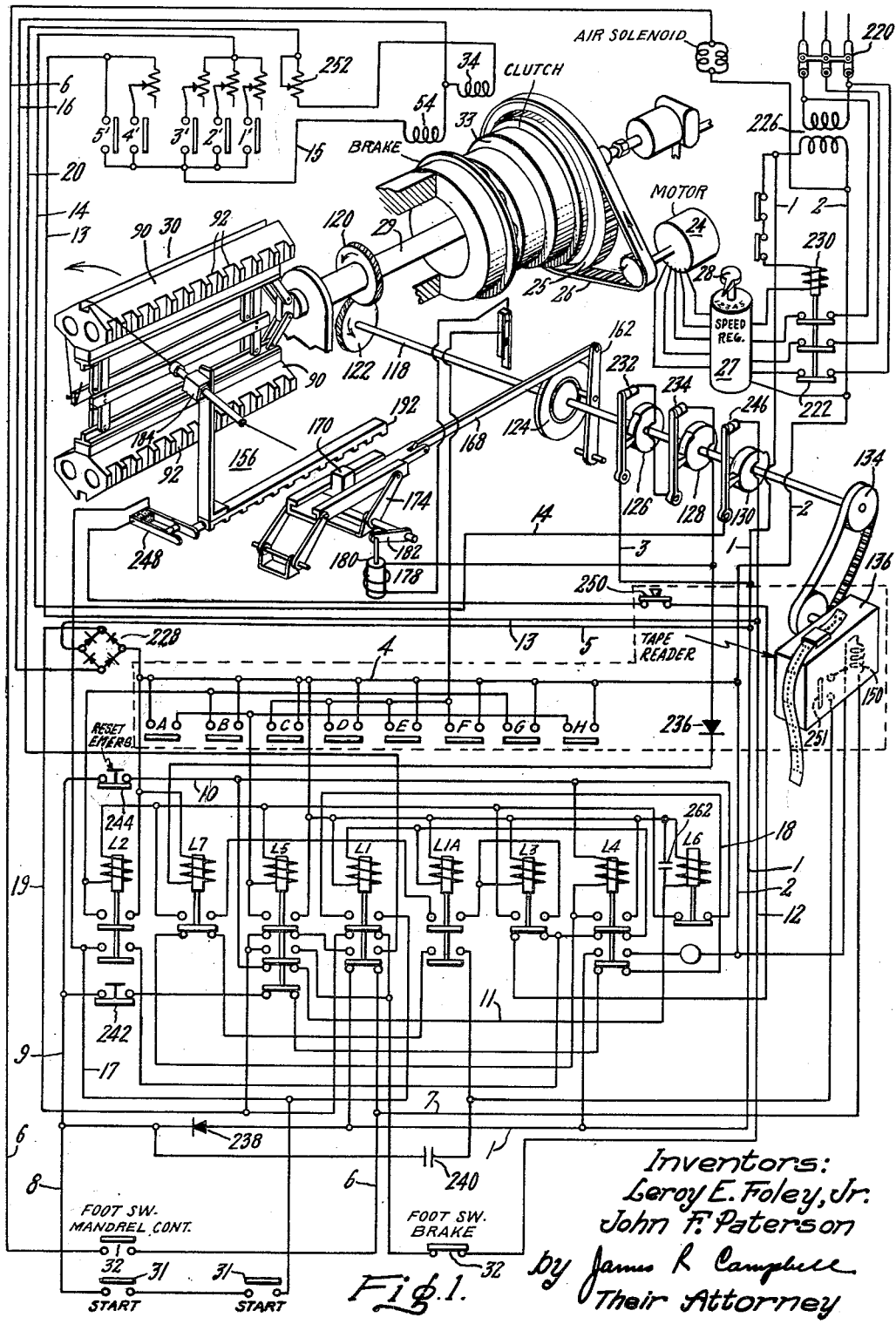
FIGURE 1 is a perspective view of the rotating parts of the coil winding machine including a schematic diagram of the circuitry necessary for controlling the machine under automatic conditions of operation.

Referring now to the drawings wherein like reference characters designate like or corresponding parts throughout the several views, there is shown in FIGURE 1 a perspective-schematic view of the coil winding system while FIGURE 2 illustrates a physical embodiment of the machine as it currently is used in winding the type of coil illustrated in FIGURE 3. FIGURE 1 primarily shows those mechanical operating parts involving motion and the associated control means for actuating and synchronizing such parts to obtain complete automatic operation in carrying out the coil winding process. Generally, the system consists of a variable speed motor driving a coil receiving mandrel through a magnetic clutch and brake. A power take-off shaft permanently geared with the main mandrel shaft supports a plurality of cams and terminates in a drive pulley utilized in moving operative parts in a tape reader head, which is a condition responsive device. The tape shown inserted in the head contains punched holes representing coded information and includes channels respectively serving as start, run and stop codes. Since the reader head is synchronized with mandrel shaft movement, the tape is caused to move through the head at a predetermined rate and in doing so energizes the several circuits for completely controlling machine operation.

Referring more specifically to FIGURES 1 and 2, there is shown a table 22 supporting the coil winding machine 23 and a motor 24 mounted beneath the table but connected with a drive gear 25 by a rubber belt 26. The motor is controlled by a regulator 27 having a handle 28 selectively operable to a number of different positions for turning the drive shaft 29 and its direct connected mandrel 30 at any one of a plurality of speeds. The table also includes palm start buttons 31 and foot pedals 32 utilized in controlling various operative parts of the machine.

As illustrated in FIGURE 6, the gear 25 is equipped with a cavity of sufficient depth to contain the operative parts of a clutch 33 used for coupling motor 24 to the drive shaft 29. The clutch is of a conventional electromagnetic type and includes a coil 34 supported in a housing 35 which is spaced from clutch plate 36 normally biased to a non-engaging position. Studs 38 are threadably engaged with the drive gear and serve to support clutch plate 40 and to permit slidable movement of the clutch plate thereon during clutch operation. Bearings 42 are positioned between the drive gear and the shaft 29 to permit smooth and uninterrupted movement of the gear thereon when the clutch is not engaged. However, upon energization of coil 34, the clutch plate 36 is drawn into contact with the housing 35 thereby transmitting power from the motor and drive gear through the studs 38, plate 36 and housing 35 to the shaft for operation of mandrel 30 attached to the opposite end thereof.

The brake 46 consists of a cylindrical shell 48 attached to a second housing 50 by means of bolts or similar securing means 52. The shell encloses a brake coil 54 and a portion of studs 56 which are threaded into the housing 35. These studs 56 likewise support a brake plate 57 biased to a disengaged position by springs 58. When the brake is not applied, it will be seen that the plate 57 rotates with housing 35 and shaft 29. However, upon energization of coil 54, the brake plate is drawn into engagement with shell 48 thus providing the necessary frictional force for stopping rotation of the shaft.

The other end of shaft 29 terminates in a spindle 60 having a flange 62 supporting the collapsible mandrel 30. The spindle is equipped with twenty bolt-receiving holes and the flange with six in order to permit adjusting the mandrel on the shaft within angular limits of 9°.

The mandrel comprises a pair of parallel housings 66 each of which is equipped with openings on one end for receiving a serrated eccentric 68 operated by a handle 70 and used for securing a loose end of the wire in position prior to commencement of the winding operation. The other end of housing 66 terminates in the flange 62 and is designed to rotate therewith.

A pair of collapsible arbor jaws 72, supporting coil-receiving form blocks 90, is connected to the housings 66 by a plurality of pairs of pivoted levers 78 and 80. As indicated in FIGURE 6, the arbors are designed for collapsing movement to the left as shown by the arrows. As illustrated in FIGURES 7 and 8, each of the arbor jaws 72 is of T-configuration and is equipped with a spring-loaded plunger 82 actuated by a lever 84 removably attached to the arbor jaw by means of a knurled screw 86. Each side of the arbor jaws is cut away on both sides at 88 to form a flange adapted for receiving the form blocks 90 employed for receiving the wire. As shown in FIGURES 1, 2 and 7, the form blocks 90 are substantially square shape and are equipped with a plurality of slots 92 for receiving the wire when it is wound therein for forming each coil of the winding. Each block is equipped with a mating opening 94 for receiving the plunger 82 which locks the block in position after installation on the arbor jaws. The block 90 is detachably secured to the flange portions of the arbor jaw by a cooperating flange 96, such that the form block can be slid longitudinally in position and locked therein by means of plunger 82. As illustrated in FIGURE 8, in order to provide for winding coils of different diameters intermediate spacers 98 can be used for effectively increasing the distance of the surface of the space blocks from the center of the mandrel. These spacers are likewise equipped with plungers 100 having an actuating arm 102 and flange portions 104 for securely positioning and locking the spacers to the mandrel jaws. Flange 106 is then utilized for receiving the space blocks as in the manner previously described. Coils of the type designed to be formed by the machine disclosed in this application are useful in small size motors and generators wherein a multiplicity of wires are positioned in each slot of a stator magnetic core. Such coils comprising the stator winding are commonly referred to as a random winding in order to distinguish this winding from formed coils of the bar type which are used in the larger size machines and is commonly referred to as a form wound coil or winding. It will be apparent that the invention is not restricted to forming windings useful only in motors and generators.

As mentioned above, the mandrel is adapted for collapsing movement in the direction indicated by the arrows. It will be evident that collapse of the arbor is necessary to remove a coil after it has been wound in the slots formed on the peripheral surface of the space blocks. In order to obtain such collapsing movement, the spindle flange 62 which is integrally connected with the parallel housings 66, is equipped with a cylindrical and outwardly protruding portion 108 having its outer end attached to a pushrod 110 which is connected at 112 to a double-acting piston 114 which is positioned in a rotatable cylinder 116. Conventional four-way air valves (not shown) are connected with the cylindrical housing 116 to permit the suplying and venting of air from opposite sides of the piston and thus achieving to-and-fro actuating movement of the pushrod, which in turn, imparts force to the arbor jaws for moving them to either a closed or open position. This action, obtainable by the arbor jaws when the pushrod is actuated, results from the unique position of levers 78 and 80. In the open position, levers 78 are located slightly over top center. The slight horizontal component of force resulting from the vertical force when the coil wires are wrapped around the arbor, holds the arbor jaws against a stop 81 thus preventing collapse of the arbor. When the arbor is collapsed, the levers 78 are substantially horizontal, but are prevented from assuming a perfect parallel position by the jaws 72 which bear against housing 66. In the open position, levers 80 are so located and are of such length that they incline at an angle towards the closing direction of jaws 72. These levers 80 are anchored to sliding block 108 to which the pushrod is connected.

When the pushrod is actuated and arbor jaw movement in a closing direction is initiated, the horizontal component of force in levers 80 is much greater than that existing in levers 78, so that levers 78 pass over top center and cause jaws 72 to move towards each other and simultaneously away from their stops 81. As the jaws approach each other, the angle between the planes of levers 78 and 80 becomes less and less until at the completely collapsed position, levers 80 are at a greater angle from the horizontal than levers 78, which is just sufficient to provide a slight collapsing or unbalanced component of force. Therefore, the resultant unbalanced force becomes less and less as the arbor collapses. Because of this unique relationship between the levers, the resultant force moving the jaws is large at the beginning of movement where it is required, and small at the end where it is not required. A beneficial advantage resulting from this construction is that injury or damage to objects, such as a finger, is not possible in the event it is inadvertently caught between the collapsing arbor jaws. The maximum amount of force applied to the jaws occurs in a horizontal direction when there is little or more movement of the jaws inwardly toward each other, while the force available for a compressing action on any object is very small when the jaws are in a substantially closed position. This inward movement of the jaws releases the tension in coils wound in slots of the space blocks, and when the jaws are completely collapsed, removal of the winding is easily accomplished. When air is introduced into the opposite side of the piston to obtain opening of the arbor jaws, a slight unbalance of force only is necessary to effect such movement. Obviously, the speed of action and the force imparted to the arbor is regulated by adjusting the volume and pressure of air introduced into the cylinder.

In order to provide for mechanical power necessary for actuating the mechanical operating parts, a take-off shaft 118 is connected to the mandrel drive shaft 29 through a pair of helical gears 120 and 122. These gears are positioned within a housing 50 and are bathed in oil in a conventional manner. The shaft supports an internal cam 124 and three separate but identical cams 126, 128 and 130 and a drive pulley 134 associated with the tape reader head 136. The gears 120 and 122 have a 1:1 ratio and it therefore will be seen that each of the cams and the drive pulley to the tape reader head all rotate at the same speed as the mandrel drive shaft 29.

The tape reader head 136 is of conventional construction and is identified as Model 2 by the Commercial Controls Corporation, Rochester, New York. As previously indicated, the tape reader head is a condition responsive device and serves the function of preparing the circuits for actuating mechanical and electrical parts to obtain starting, running and stopping of the machine. It also controls other circuit components for winding a predetermined number of turns of wire in each slot on the mandrel, and for successively shifting the wire being wound from one slot to the next adjacent one at an exact period of time.

The reader head comprises a housing 138 which includes a plurality of pins 140, totaling eight in number, and are adapted for movement upwardly out of the casing to the position shown in FIGURE 4. They are actuated by an arm 142 equipped with a cam follower 144 riding on a cam 146 attached to a shaft 148 associated with the drive pulley 134. The pins are spring mounted in such a manner that when the cam follower rides on the rise part of the cam 146, the pins are pulled downwardly and when the cam follower appears on the dwell part of the cam, the pins are actuated by the springs associated therewith to the up position. It therefore will be seen that as the mandrel shaft 29 and power take-off shaft 118 rotate, shaft 148 likewise will rotate at the same speed and cause the lever arm 142 to move upwardly for each revolution of the main mandrel shaft. Since all of the eight pins are actuated by lever 142, if a tape does not appear in the reader head, all of the pins will be moved to the up position as shown by pins 140 in FIGURE 4. If a tape is positioned in the reader head, only those pins will appear which can protrude through openings provided in the tape. These openings, placed in the tape in a predetermined fashion, are the codes. The modification made to the conventional tape reader head purchased is that of including the lever and cam arrangement illustrated in FIGURE 4, in addition to a solenoid 150 which is used for moving the lever 142 upwardly and thereby causing the pins to be retracted.

Without the solenoid, the pins would appear in an up position and it would not be possible to insert the tape. The tape adapted for use with the tape reader head is also commercially available and coded information can be punched into it.

The tape shown in FIGURE 5 has pinholes or apertures representing a start code, run codes and stop code, and longitudinal transverse pinholes used for advancing the tape through the tape reader head 136. The start, run and stop code pinholes total eight in number and are punctured along the width of the tape, and each pinhole is referred to as a channel. As illustrated in FIGURE 5, channels 2 and 7 represent the start code, channels 3, 4, 5 and 6 as run codes and channels 1 and 8 as a stop code. The apertures 152 running lengthwise of the tape are engaged by pinpoints 154 for moving the tape through the head. Obviously, a greater or lesser number of channels and codes may be used.

When the tape is placed in the tape reader head 136 the start code is aligned with holes through which pins 140 are adapted to protrude. As described hereafter, all of the eight reader head pins are moved upwardly, but only pins 2 and 7, representing the start code, will go through the aligned pinholes in the tape. They close certain contactors in the control circuitry of the machine. Since the reader head is directly connected to the mandrel shaft 29, the pinpoints 154 are arranged to advance the tape one step, that is, from one aperture 152 to the next aperture, for each mandrel shaft revolution. Each step therefore, represents one turn of wire in each mandrel form block slot, and the number of turns of wire comprising each coil in each slot is controlled directly by the number of apertures 152 punched longitudinally in the tape. After the tape has moved a sufficient distance in the reader head to align the run code pinholes 3, 4, 5 and 6 with pins 140, the latter are again moved upwardly, the tape is read and certain circuits energized, as described hereinafter, to move the wire advance mechanism to the next form block slot. The above stepping process is then repeated with the number of turns of wire being wound in the second slot in accordance with apertures 152 in the tape. When this coil is wound, the process is repeated for moving the wire advance mechanism to the third slot, and so on, until the tape reads the stop code which energizes certain circuits for stopping the machine.

As previously indicated, the wire advance mechanism 156 not only guides the wire into each mandrel form block slot for forming the coils, but also, moves in steps along the length of the mandrel for shifting the winding of wire into the next adjacent slots. As indicated in FIGURE 2, the wire advance mechanism is slidably positioned in a housing 158 and is adapted for movement longitudinally thereof as indicated by the arrows. The housing 158 is filled with oil supplied through a pipe 160 for bathing the operating parts in oil.

Referring more specifically to FIGURES 10, 11 and 12, the housing 158 is provided with a depending portion 160 which houses the internal cam 124 on shaft 118 and other operating parts associated therewith. The cam is provided with a uniformly accelerated face with a rise, dwell, fall and dwell contour and is designed to actuate a link or cam follower 162 pivoted at its bottom end 164 to a spring housing 166. Pivotally connected to link 162 is a lever 168 engageable with a plate having a pawl 170 formed on the upper surface thereof. Bosses 172 are affixed to opposite side walls of the housing 158 and support crankshafts 174 which are connected to guide plate 176 for housing the plate supporting pawl 170. Each revolution of the cam therefore oscillates the pawl plate in the direction shown by the arrows in FIGURE 11. A solenoid 178, mounted exteriorly of the housing, is equipped with a plunger 180 connected to an arm 182 which is directly connected to the crankshaft 174. The adjustable wire guide 184 comprises a part of the wire advance mechanism and is equipped with a slide plate 186 adapted to ride in a pair of V-shaped guides 188 secured to a wall of the housing by means of bolts 190 or similar securing means. Rack 192 is secured to the underside of the slide plate and is adapted for movement in unison therewith. As illustrated in FIGURES 10 and 11, the single unit comprising the slide plate, rack and adjustable wire guide, is adapted for movement from a position shown in dotted lines on the left side of the figures, and corresponding to that position where the wire is initially wound on the mandrel, to the position shown in full lines in the center of the figures where it has reached its extreme point of travel and completion of the coil winding has been accomplished.

The wire advance mechanism is designed to move in steps or stages and through a distance equal to the width of the slots in the mandrel form blocks. It will be evident that when the wire advance mechanism is placed in a position to guide wire into the first slot of the mandrel, the pawl 170 will be aligned with a mating slot in the rack, such as the one indicated at 194 in FIGURE 11. During operation, after wire has been guided into the first slot for the prescribed number of turns, the internal cam will oscillate the links 162 and 168 in a to-and-fro direction. During each revolution of the mandrel the pawl will not engage any one of the slots 194. However, when the desired number of turns is reached in the first slot and at a time when the wire should be guided into a second mandrel slot, solenoid 178 is energized to move the pawl upwardly into engagement with a slot 194. During the next revolution of the cam 124, the engaged pawl moves the rack forwardly a distance equal to the width of a mandrel slot by the oscillating action of cam 124. As the lever 168 falls off the raised portion of the cam, the solenoid is de-energized and the pawl then drops out of position thus leaving the rack in a fixed position until the predetermined number of turns is wrapped in the appropriate mandrel slot, at which time, the above-described action is repeated and the rack again moved to permit the guiding of wire into the third mandrel slot. In order to retain the rack in its preset position, a lever 198 having a ball 200 on one end is biased to an upward position by spring 202 supported on a stand rigidly affixed to the housing. Since the lever is spring loaded, it is permitted to ride easily from one slot to the next when the rack is moved by the action of pawl 170.

The housing 166 further encloses a bar 204 threaded into a hollow rod 206 mounted in an upstanding plate in the housing. A spring 208 is biased between two discs 209 which serve to compress the spring to a degree sufficient to permit normal operation of pawl 170 unless the lever arrangement becomes jammed. Since link 162 is pivoted on the spring housing, the latter imparts flexibility to the system so that if any of the parts jam during operation, such flexibility will prevent damaging of the parts. When any jamming action is clear, the slide automatically resets itself for further and continued operation. Because of the adjustability features incorporated in the spring housing, the rack and pawl arrangement also can be adjusted to obtain the desired degree of fit therebetween.

Referring now to the circuits used in controlling operation of the various machine parts, it will be seen that the system is supplied with 220 volt, 3 phase, 60 cycle power through a main switch 220 and contactors 222 to the motor speed regulator 27. The regulator may have any desired number of speed steps compatible with the motor design or D.-C. voltages may be used for accommodating a D.-C. motor. A step-down transformer 226 reduces the voltage to 110 volt A.-C. for operating the wire advance mechanism solenoid 178, the solenoid for the actuating pins 140 in the reader head and the solenoid for the four-way air valve controlling collapse of the mandrel. The remaining circuit elements such as the brake and clutch and relays shown in the bottom portion of FIGURE 1, are supplied with D.-C. voltages through a full wave rectifier 228.

Various contactors designated by letters A through H are enclosed by dotted lines with the reader head thus showing that these contactors are within the reader head housing. As previously explained, spring loaded pins 140 are connected to operate the contactors A through H and are moved by cam follower lever 142 to the up position during each revolution of the mandrel. When a coded, punched tape is inserted in the head, any pins aligned with tape openings will protrude therethrough, and in doing so, close their associated contacts. The pin-contactor arrangement is well known as is incorporated in the commercially-available reader head.

The operation of the coil winding machine and function of the electrical components used in control thereof is as follows: The position of the electrical and mechanical parts shown in FIGURE 1 is that corresponding to the condition where the main switch is closed and the motor is running.

When the main switch 220 is closed, solenoid 230 is energized through motor overload protective devices and closes contactors 222 for supplying power to the motor. Movement of handle 28 to a desired start position on the speed regulator starts the motor. The secondary of the transformer supplies 110 volt A.-C. power through lines 1, 3 and 2 to the wire advance mechanism solenoid 178 through contacts 232 and 234 of the shaft mounted cams. This solenoid circuit is not energized, however, since reader head contactors C, D, E and F are not closed in the return line 2 of the transformer secondary. A rectifier 236 in circuit with the cam operated switches supplies D.-C. power for picking up relay L7 and sealing in its contactors as shown, return to the secondary being made through line 4. A.-C. power is supplied to full wave rectifier 228 through line 5 for furnishing steady D.-C. power to the relays. A.-C. power is also supplied from 1 through closed contactors of relay L1 and lines 6 and 7 respectively to the mandrel control foot switch in the air solenoid circuit and to the solenoid in the tape reader head.

The mandrel arbor jaws 72 can be actuated selectively to the collapsed or extended position by closing the mandrel foot switch regardless of whether the motor is operated. This circuit is made inoperative, however, when the clutch is engaged, as hereinafter described, because doing so, energizes solenoid L1 and opens the circuit to the air solenoid thus preventing actuation of the pushrod and connected collapsing mandrel parts when the mandrel is rotating. As mentioned previously, the function of the reader head solenoid is to move reader head pins 140 downwardly to permit insertion of the tape. When the tape is inserted, reader switch 250 is closed by the tape and upon deenergization of the solenoid, the pins are permitted to move upwardly and read any code punched in the tape.

A half wave rectifier 238 in parallel with a smoothing condenser 240 supplies D.-C. power through line 8 to normally open palm start buttons 31 and through 9 to emergency stop switch 242 and emergency reset contactors 244 to energize relay L6 through lines 10, 11 and 4. Normally, the brake is applied to the mandrel drive shaft and can be released only by pushing the brake foot switch to the open position. This facility is made available to permit manual rotation of the mandrel to various positions without using the motor. In normal operation, brake actuation is under control of the circuit elements. With the machine in a static condition, the brake is applied through a circuit including line 5, rectifier 228, closed contactors of L1, brake foot switch, lines 12 and 13 and motor speed regulator contactors 4' and 5' (or parallel circuit including cam contactors 246, line 14 and motor speed regulator contactors 1', 2' or 3'), line 15 and return through the brake coil and line 16 to the rectifier 228.

With the circuit elements energized as above, the palm start buttons 31 are depressed to commence the coil winding operation. This closes a circuit from rectifier 238, palm switches, line 17, wire advance mechanism limit switch 248, reader switch 250 which has been closed by the tape, closed contactors of L3 and L4 and energizes L1 and L1A relays. If the wire advance mechanism rack 192 is not in a position opposite the first slot of the mandrel relays L1 and L1A will not seal in because switch 248 will open the circuit. Likewise, if a tape is not in the reader head, switch 250 will remain open and prevent energization of L1 and L1A thus keeping the brake applied to the machine and de-energizing the clutch.

Upon energization of L1, its top switch bar opens the brake foot switch circuit which de-energizes the brake coil 54 and prepares the mandrel for operation. Its lower switch bar opens the contactors in the reader head solenoid circuit, de-energizing the solenoid therein and permitting the pins 140 to move up, read the tape and close contacts B and G which correspond to the start code of channels 2 and 7 punched in the tape. The now closed upper contactors of L1 seal in a circuit around the palm start switches through line 18, closed L4 and L5 contactors, and the emergency stop switch 242. Should it be necessary to de-energize the system, emergency stop switch 242 can be pushed to the open position for de-energizing relay L1 and L1A in circuit therewith. The contactors now closed by the lower switch arm complete a circuit from the top of rectifier 228 through line 19 closed L5 and L1 contactors line 20, variable resistor 252 and the clutch, thus energizing it and commencing rotation of the mandrel.

When L1A seals in, its upper set of contactors provides D.-C. power from rectifier 238, reset switch, L6, L7 and L1A contactors for subsequently energizing L3 relay. L3 lower contactors in the palm switch circuit, which is open when the buttons are released, are open with no effect on the circuit. Closing of the L3 upper contactors completes a parallel circuit with L7 and L1A contactors for keeping L3 relay energized.

The reader head has conventional parity checking facilities wherein if an odd number of holes in the tape are read, as distinguished from the even number punched in the tape, a plurality of contactors, represented by the single contactor 251, are closed in a certain pattern in accordance with the number of holes to complete a circuit to pick up L4 relay whose contactors are in the L1 and L1A relay circuit. Opening of the latter will cause de-energization of the clutch and application of the brake for stopping the machine. The lower contactors of L1A prepare the circuit for reception of a signal in the event the wrong code is used on the tape.

Simultaneous with de-energizing of the reader head solenoid, pins 2 and 7 of the start code read the tape and close their associated contacts B and G which pick up L2 relay by way of closed L6 contactors, reset switch and rectifier 238.

With the elements thus conditioned as described above, the brake is de-energized, the clutch energized, the reader solenoid in the reader head is de-energized and the pins have read the tape. The mandrel then starts to rotate.

Since the cams on take-off shaft 118 rotate at the same speed as the mandrel, the dwell part of the internal cam 124 causes the wire advance mechanism to oscillate while the other cams 126 and 128 move the cam switch arms in a direction to operate the cam switch contacts 232 and 234. This opens the circuit to relay L7 and it falls out, closing its upper contacts which pick up relay L3 through the closed upper contacts of L1A. Opening of L3 lower contacts, opens the palm switch-L1-L1A circuit which normally would actuate the clutch and brake to inoperative positions. However, if the tape was properly read and L2 picked up as described above, L1 and L1A remain sealed in with no effect on the machine.

Assuming the tape has been properly read and pins 140 retracted, the mandrel continues to turn and wire is guided in the first slot to form the first coil of the winding. Since belt 134 drives the reader head mechanism at the same speed as the mandrel, pins 154 will advance the tape a space equal to the distance between adjacent apertures 152 in the tape for every revolution of the mandrel. If the tape has six apertures, indicated by 152, in it, six turns of wire will be wound in the first slot. The tape will continue to move until tape channels 3, 4, 5 and 6 appear over pins 140. When this occurs, these pins will protrude through the corresponding pinholes, and in so doing, close their associated contacts, C, D, E and F. Simultaneously with the reading of the tape, the cams 126 and 128 close their contacts 232 and 234 thus completing a circuit through the pawl solenoid 178 and normally closed limit switch 260. When this occurs, the pawl solenoid moves the crankshaft 174 (FIGURES 10–12) upwardly to cause pawl 170 to engage rack 192. Continued rotation of shaft 118 causes the cam follower 162 and levers 168 to advance the wire advance mechanism forward one notch. This distance corresponds with that necessary to cause the wire to be moved into the second slot and thereby start winding of the second coil. Cam 146 in the reader head (FIGURE 4) is positioned to be timed with cams 124, 126 and 128 such that when the wire advance mechanism is approximately in the position to permit wire to enter the second slot, the reader head cam follower is falling and thereby retracting pins 140 from the tape. Simultaneously, cams 126 and 128 start opening their associated contacts to drop out pawl solenoid 178 and thus effect reverse movement of crankshaft 174 and consequent disengagement of the pawl with the rack. When the function served by these parts is completed, the mandrel will continue winding a number of turns of wire in the second slot in accordance with the number of apertures 152 punched in the tape. When that predetermined number is reached, the tape reader head again reads the run code and advances the wire to the third slot, and so on, as described above. The spacing between tape channels 3, 4, 5 and 6 along the length of the tape determines the number of turns wound in each slot, and the number of appearances of channels 3, 4, 5 and 6 determines the number of coils wound in the slots to comprise the complete winding.

After all the run codes are read and coils wound in the several slots on the mandrel, as the wire reaches the end of the last turn for the last coil, stop code channels 1 and 8 are read by the tape. Their associated contacts A and H close, thus energizing and sealing in relay L5 in the circuit including closed L6 contactors and the emergency reset switch. Since the lowest L5 contactors are in the L1 and L1A relay circuits, opening thereof de-energizes L1 and L1A coils, thus de-energizing the clutch and energizing the brake to stop mandrel operation. This circuit includes the rectifier 238, emergency stop switch, closed L5, L4, L1, L2 contactors, L1 and L1A relays and line 4. Opening of the middle L5 contactors de-energizes L6 relay. L6 is provided with a time delay capacitor 262 however, to reset the machine after it has stopped in the desired position. Stopping of the mandrel at a desired angular position is accomplished by manual adjustment of rheostats associated with contactors 1′, 2′, 3′, 4′ or 5′. These latter contactors are controlled by speed regulator 27 such that selection of speeds 1 through 5 will actuate the corresponding contactors 1′ through 5′ to provide for application of regulated power to the brake. Power is applied to brake at all times except when the mandrel is rotating. The angular stopping position of the mandrel at different speeds is selected by regulating the amount of current supplied to the brake coil through the rheostats. Application of small amounts of power will permit the mandrel to rotate through a larger angle after application of power, and therefore effectively coast. The greater the power, the quicker the mandrel will stop. When L6 finally drops out, it de-energizes L2, L3 and L5 relays. Closing of L5 contactors again closes a circuit to L6 relay for picking it up and it then serves as a reset device for the tape reading circuits. To remove the wire from the mandrel, the mandrel control foot switch is depressed for energizing the air solenoid connected with the four-way air valve. Introduction of air to one side of the piston 114 and venting of air from the other side causes the pushrod 110 to be moved in a direction to the left as shown in FIGURE 6, thus causing the arbor jaws 72 to move to the left and thereby collapse. The eccentrically mounted wheel is moved by handle 70 to a position to permit removal of wire from its locked position and the wound coil can then be removed from the mandrel space blocks.

To commence a new operation, the wire advance mechanism is pulled back to a start position opposite slot 1 in the mandrel thereby closing limit switch 248 to complete the circuits for another operation. In order to move the mandrel from its collapsed to an extended position for receiving the wire, it is only necessary to depress the mandrel control foot switch which energizes the air solenoid for causing the air piston to move the pushrod to the right, and thereby draw the arbor jaws and attached mandrel with it. The tape is reset in the reader head in a position where the start code is placed above the pins adapted to protrude upwardly and through the tape. Operation of the machine and the coil winding process is then initiated again by depressing the palm start switches.

In view of the above, it will be evident that many modifications and variations are possible in light of the above teachings. For example, any kind of control device capable of serving the reader head functions may be used with the system for energizing the several circuits. A linear motor, for example, may be used in lieu of the air-actuated piston controlling collapsing movement of the mandrel or in lieu of the wire advance mechanism for moving the wire from one mandrel slot to the next adjacent one.

A modified reader head consists of a bakelite or cardboard disc which is geared to the winding head in a manner to rotate 1/60 turn per revolution of the mandrel. One complete revolution of the disc represents the maximum number of turns to be wound in a given slot. A conventional photosensitive device, such as a photocell, photodiode, photo-transistor, or the like, is mounted behind the disc on a ratchet positioning mechanism which moves the photo device laterally across the disc in steps. Each step corresponds to one slot pitch. The disc is equipped with radially aligned holes formed in concentric planes having different radii. The angular spacing of the holes defines the number of turns to be counted and the radial spacing defines the number of slots to be wound. As the mandrel rotates, the disc is rotated at a corresponding speed and the photo device scans it when the machine is operating. When the first hole appears, the photo device engages the wire advance mechanism and causes it to wind wire in the next slot. The photo device is moved mechanically or electrically on to the next radial line, and so on, until the machine completes the winding cycle.

It therefore is to be understood that within the scope of the appended claims, the invention may be practiced otherwise than as specifically described.

What we claim as new and desire to secure by Letters Patent of the United States is:

1. A coil winding machine for winding random wound coils comprising a motor selectively engageable with a drive shaft supporting a mandrel, said mandrel comprising arms movable between an extended and collapsed position and having wire receiving means on the arms for receiving wire utilized in forming coils comprising a winding, a mechanism mounted adjacent said mandrel for guiding wire into said receiving means, and a device connected with the mechanism and responsive to changes in a component associated therewith for controlling the number of turns of wire wound in each coil and the movement of the mechanism longitudinally of the mandrel.

2. A coil winding machine for winding random wound coils comprising a variable speed motor selectively engageable with a shaft supporting a mandrel, arms in said mandrel movable between extended and collapsed positions, and means on said arms equipped with slots for receiving wire adapted to be wound therein for forming coils comprising a winding, a wire guide and advance mechanism positioned adjacent said mandrel and movable longitudinally thereof for guiding wire sequentially into the various mandrel slots and a condition responsive device mechanically connected with said shaft and electrically connected with said wire advance mechanism, and means in said condition responsive device sensitive to disposition of a component associated therewith for counting the number of revolutions of said shaft which corresponds exactly with the number of turns of wire wound in said mandrel slots, said means being further effective in causing electrical actuation of said wire advance mechanism for effecting movement thereof to a next slot when the desired number of turns have been wound in the previous one.

3. A coil winding machine for winding random wound coils comprising a variable speed motor selectively engageable with a drive shaft supporting a mandrel on one end thereof, slots on said mandrel for receiving wire arranged to be wound therein for forming the coils of a winding, a mechanism mounted adjacent said mandrel for guiding wire into the various slots, said mechanism comprising a plate having a wire guiding member thereon for guiding the wire into said slots, indentations on the plate engageable by a motion transmitting device, a second shaft connected with said drive shaft and being equipped with a cam, a cam follower associated with said cam and connected with said motion transmitting device so that said device is caused to oscillate one cycle for every revolution of the drive shaft, and a condition responsive device connected for actuation by said second shaft and electrically connected with said mechanism for controlling the number of turns of wire wound in each slot and for controlling the number of times the wire advance mechanism is moved longitudinally of the mandrel thereby determining the number of coils comprising the winding.

4. A coil winding machine for winding random wound coils comprising a variable speed motor selectively engageable with a drive shaft supporting a mandrel on one end thereof, slots in the mandrel for receiving a predetermined number of turns of wire in each slot for forming a plurality of coils comprising a winding, a wire guide and advance mechanism positioned adjacent said mandrel and movable axially of the mandrel for shifting the wire from one slot to the next adjacent slot after the predetermined number of turns of wire have been wound therein, a power take-off shaft connected with a condition responsive device, a component having coded information therein representing the number of turns desired to be wound in each of said slots and the number of slots adapted to have wire wound therein, means connecting said component with said condition responsive device such that the connection between said power take-off and said condition responsive device causes said component to be moved through said device and in so doing control the amount of time that wire is being guided into any one slot, and control means interconnecting said condition responsive device and said wire advance mechanism for actuating the latter when it is desired to move the wire advance mechanism from one slot to the next slot and thereby shift the winding of wire therein.

5. A coil winding machine for winding random wound motors comprising a motor selectively engageable with a drive shaft having a mandrel supported on one end thereof, form blocks on said mandrel having slots adapted to receive wire therein for forming a plurality of coils comprising a winding, a power take-off shaft permanently geared with said drive shaft and arranged for rotation in a direct ratio therewith, cam means mounted on said power take-off shaft, a wire guide and advance mechanism positioned adjacent said mandrel and arranged for movement longitudinally thereof for winding wire into said slots sequentially, said wire advance mechanism comprising a plate having an upstanding member through which the wire is guided to said slots, a rack having a plurality of slots therein mounted on said plate, a pawl connected with said cam means and of a size sufficient to fit into the slots of said rack, said pawl being positioned below said rack so that upon upward movement thereof, the pawl is permitted to engage one of said rack slots and move the plate a distance equal to one rack slot pitch and thereby cause guiding of the wire from one mandrel slot into the next adjacent mandrel slot, a tape reader head connected with said power take-off shaft, means in said head connected for rotary movement by said power take-off shaft, a tape in said reader head positioned for actuation by said last-named means, said tape having coded information punched into it representing the number of turns of wire to be wound in any one of said slots and the number of slots to have wire wound therein for forming the coils, said tape reader head means being responsive to said coded information and being electrically connected with said pawl for moving the latter upwardly into engagement with said rack slots and causing selective movement of said plate longitudinally of said mandrel whereupon said cam means causes disengagement of said pawl from said rack slots when said rack has been moved through said distance.

6. A coil winding machine for forming random wound coils comprising a motor selectively engageable with a drive shaft supporting a mandrel, slots on said mandrel for receiving wire arranged to be wound therein for forming separate coils of a winding, a clutch and brake interposed between said motor and said drive shaft, a wire advance mechanism positioned adjacent said mandrel and adapted for movement longitudinally thereof and being arranged to guide the desired number of turns in the various slots on said mandrel, a power take-off shaft directly connected with said drive shaft, means interconnecting said power take-off shaft and said wire advance mechanism for moving the latter longitudinally of the mandrel at a predetermined time, a device connected with said power take-off shaft, a component having coded information thereon associated with said device, said coded information representing start, run and stop codes, electrical control means interconnecting said device with said clutch and brake and with said wire advance mechanism so that when the start code on said component is detected by said device, said control means are energized to apply the clutch and de-energize the brake for permitting operation of the mandrel with consequent guiding of wire into the mandrel slots, said responsive device having a member driven by said power take-off shaft at the same speed as said mandrel, means connecting said component with said member so that every revolution of the mandrel is reflected in said component through said member and when the desired number of turns of wire has been wound in any one slot, the responsive device detects or reads the run code and actuates the control means for moving the wire advance mechanism to the next slot, and when said device detects said stop code on the component, the control means is made operative to de-energize the clutch and apply the brake for stopping operation of the machine.

7. The combination according to claim 6 wherein a mandrel-stopping time delay cam is mounted on said power take-off shaft, switch means positioned for actuation by said cam and having contacts in circuit with time delay variable resistors and a coil for said brake and a speed regulator connected with said motor, whereby said resistors can be adjusted for applying the brake to the drive shaft and selectively stopping rotation thereof in a predetermined position.

8. The combination according to claim 6 wherein said control means includes an emergency switch in circuit with said control means controlling the brake and clutch, said emergency switch being positioned on said machine in a convenient location such that opening of the switch by an operator opens the electrical circuit including said brake and clutch for stopping rotation of the mandrel.

9. The combination according to claim 6 wherein said mandrel comprises a pair of arms movable to an extended or a collapsed position, means connecting said movable arms to a power device, and a switch in said control means and located in circuit with said power device for selectively actuating said mandrel to either an open or a closed position.

References Cited in the file of this patent
UNITED STATES PATENTS

| | | |
|---|---|---|
| 1,807,199 | Dear | May 26, 1931 |
| 2,122,485 | Nelson | July 5, 1938 |
| 2,335,602 | Nash | Nov. 30, 1943 |
| 2,614,588 | Laycock | Oct. 21, 1952 |
| 2,736,346 | Amman | Feb. 28, 1956 |
| 2,762,577 | Herr | Sept. 11, 1956 |
| 2,835,042 | Tandles et al. | May 20, 1958 |
| 2,854,856 | Oppen | Oct. 7, 1958 |

FOREIGN PATENTS

| | | |
|---|---|---|
| 264,104 | Switzerland | Dec. 16, 1949 |